United States Patent
Hauler et al.

(10) Patent No.: US 6,721,634 B1
(45) Date of Patent: Apr. 13, 2004

(54) METHOD AND DEVICE FOR DISPLAYING A MEASURED VALUE IN A VEHICLE

(75) Inventors: Peter Hauler, Ettlingen (DE); Michael Walther, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/110,829

(22) PCT Filed: Oct. 10, 2000

(86) PCT No.: PCT/DE00/03544

§ 371 (c)(1),
(2), (4) Date: Aug. 12, 2002

(87) PCT Pub. No.: WO01/28803

PCT Pub. Date: Apr. 26, 2001

(30) Foreign Application Priority Data

Oct. 19, 1999 (DE) .......................................... 199 50 155

(51) Int. Cl.$^7$ ............................................... B60K 35/00
(52) U.S. Cl. ........................................... 701/1; 340/441
(58) Field of Search ....................... 701/1, 29; 340/438, 340/439, 441

(56) References Cited

U.S. PATENT DOCUMENTS

| | | | |
|---|---|---|---|
| 5,374,917 A | * | 12/1994 | Hoffman et al. ............ 340/438 |
| 5,485,161 A | * | 1/1996 | Vaughn .................. 342/357.13 |
| 5,764,139 A | * | 6/1998 | Nojima et al. ............... 340/461 |
| 5,781,872 A | * | 7/1998 | Konishi et al. ................ 701/36 |
| 5,844,505 A | * | 12/1998 | Van Ryzin .................. 340/988 |
| 5,880,710 A | * | 3/1999 | Jaberi et al. ................. 345/618 |
| 6,253,122 B1 | * | 6/2001 | Razavi et al. .................. 701/1 |
| 6,434,450 B1 | * | 8/2002 | Griffin et al. ................... 701/1 |

FOREIGN PATENT DOCUMENTS

| | | |
|---|---|---|
| DE | 38 34 229 | 4/1989 |
| DE | 40 31 870 | 4/1992 |
| DE | 44 14 657 | 11/1995 |
| DE | 195 00 668 | 7/1996 |
| DE | 29 610 677 | 9/1996 |
| DE | 196 15 249 | 10/1997 |
| FR | 2 729 345 | 7/1996 |

OTHER PUBLICATIONS

"Stern der Zukunft" [Star of the Future], from the periodical MOT–Technik, May 1991, p. 94.**
"Das Porche Informations– und Diagnosesystem" [The Porche Information and Diagnostic System] VDI Reports No. 687, 1988**.

* cited by examiner

Primary Examiner—Michael J. Zanelli
(74) Attorney, Agent, or Firm—Kenyon & Kenyon (57) ABSTRACT

A method and a device for providing for the adapted display of measured values in a freely programmable instrument cluster, in which the display is adaptively adjusted as a function of the driving and operating data of the vehicle.

11 Claims, 7 Drawing Sheets

METHOD AND DEVICE FOR DISPLAYING A MEASURED VALUE IN A VEHICLE

FIELD OF THE INVENTION

The present invention relates to a method for displaying a measured value.

BACKGROUND INFORMATION

Instrument clusters in a motor vehicle are discussed, for example, in the document "*Das Porsche Informations—und Diagnosesystem*" [The Porsche Information and Diagnostic System] from VDI Reports No. 687, 1988, in which a plurality of display instruments may be arranged as combined in one unit. In addition, displays may be provided which indicate possible malfunctions of the vehicle to a driver, such as a coolant temperature which is too high. Moreover, there are so-called freely programmable instrument clusters in which all measured quantities and warning fields may be displayed in one large screen display or projection display disposed, for example, in front of the driver. Such a screen display is discussed, for example, in the article "*Stern der Zukunft*" [Star of the Future] from the periodical MOT-Technik, May 1991, page 94. Except for a situation-dependent output of warnings, as may be available from previous instrument clusters, the display in this freely programmable instrument cluster may be limited to a situation-independent presentation of measured quantities.

SUMMARY OF THE INVENTION

In contrast, an exemplary method of the present invention provides for measured values being displayed as a function of a situation, in that the display range of a measured quantity presented may be adapted to the traffic situation. This may be accomplished by ascertaining a maximum scale value from at least one further value, such as from the driving and operating data of the vehicle and/or from external or additional traffic information. While in the case of a situation-independent display of a measured quantity, the display may need to be based on an unchanging, maximum scale value, the maximum scale value in the case of a speed indicator being oriented, for example, to the maximum speed of the vehicle, the exemplary method of the present invention may permit the display range to be adapted to the respective traffic situation and the vehicle condition. Thus, the driver may be informed more accurately about the instantaneous measured value in each instance, thereby smaller fluctuations of the measured value may be more easily recognizable, as well.

Further developments and improvements of the exemplary method include the following. The measuring range may be limited with respect to the minimum value of the scale, which may apply in the case of a coolant temperature indicator. While at the beginning of the drive, a driver may be interested in how quickly the temperature rises in the lower temperature range in order, for example, to be able to switch on the vehicle heating, after a few kilometers of driving, the temperature may generally no longer fall below a value, for example, of 70° C. Consequently, a scale range between 0° C. and 70°0 C. may be masked out, thereby permitting a range of higher temperatures to be displayed with greater accuracy.

Furthermore, in the case of driving and operating data which may require a special attention and/or action by the driver, a display of the scale may be implemented in a warning color. For example, if the display color of the coolant temperature changes into a warning color because the coolant temperature is too high, this may be indicated to the driver. Generally, the coolant temperature may lie only in a customary framework, so that a driver may not immediately observe the exceeding of a permissible value without an additional indication. With respect to the speed indicator, it may be important, for example, when driving in fog that a driver not drive faster than visibility allows. On the other hand, however, since fog may make orientation more difficult, in this case, a driver may need to rely in particular on an easily recognizable speed indicator to better estimate his/her speed. The same may hold true, for example, for driving in a tunnel or in construction site areas. Due to the additionally emphasized display of the speed scale in a warning color, the driver's instantaneous speed may be more clearly indicated to him/her.

In a situation which requires special attention and/or action by the driver, the display of the measured-value scale may be enlarged, since better readability may also be ensured. However, the additional space needed for this purpose may be only taken up by the display as long as the special attention of the driver is deemed necessary or until the action of the driver is deemed performed. If the driver, for example, has left a road section having a special speed restriction, such as a construction site, or if the driver has filled up with gas in response to too low a tank filling, a switchover may be made again to a standard display.

The maximum scale value may be selected so that it exceeds a maximally allowed measured value by at least a first percentage value and at the most by a second percentage value, the second percentage value being selected to be greater than the first percentage value. Small exceedings of a maximally allowed measured value may thereby still be displayed in the scale. Thus, for example, slight exceedings of an allowed speed or slight exceedings of the highest speed of a vehicle measured by the manufacturer may still be represented in the display.

Moreover, at least the following measured quantities may be recorded: oil pressure, coolant temperature, generator function and outside temperature as operating parameters, because all of these measured quantities may be important either for driving safety and/or for functioning of the engine. In addition to the direct display of the operating parameters in a separate display, the operating parameters may also be used for calculating a maximum or minimum scale value of another measured quantity. This may apply in the case of the speed scale. Thus, for example, in the event of a vehicle defect such as too low an oil pressure or too high a coolant temperature, it may be desirable to not drive too fast, so that, in particular, engine damage may be avoided. When the outside temperature is in the freezing-point range, which may be ascertained by a temperature sensor, there may be increased danger of the vehicle slipping due to black ice, so that an adjusted speed of the vehicle may be applied. As already explained above, an indication to the driver may then be implemented by a speed indicator which may be enlarged, altered in color and/or detailed.

Furthermore, in the case of the vehicular speed as measured quantity, initially a position of the vehicle may be ascertained on the basis of a vehicle position finding, and from this position, the road class on which the vehicle is presently located may be determined. In this manner, it may be possible to adapt the display range, thus the minimum and maximum scale value of the speed scale, to the maximum speed allowed on this class of road. In this context, the speed scale may be adapted to maximum speeds specific to countries.

Traffic signs may be detected by a camera and, particularly in the case of traffic signs which specify the maximum speed allowed, the speed scale may be adapted to the maximum speed specified by the traffic sign.

Additional traffic information may be transmitted via a radio link to a transmitter unit, e.g. to radio beacons and/or to a Service Node. Thus, the speed indicator may be adapted to instantaneous traffic conditions. For example, a message may be transmitted to a vehicle by such a radio link, where the message may indicate that because of smog or too high a concentration of ozone, a speed restriction exists locally, the display range of the speed indicator being adjusted accordingly. In addition, local speed restrictions, for example, in a tunnel or in a construction site area, may be communicated via the radio link to the vehicle and the display range may be modified according to the speed restriction.

Moreover, the driver may be able to input a speed restriction manually, by which the display range of the speed indicator is influenced. This procedure may be particularly useful in the case of restrictions which are difficult to detect or may not be detected at all. For example, when snow chains are installed, generally a maximum speed of 50 km/h may exist. However, automatic detection of the snow chains on the wheels may be costly. In the same manner, for mud and snow tires (winter tires), a speed restriction may be valid which may reduce the maximum allowed speed of the vehicle. A manual input may make it possible to adjust the speed indicator to such a maximum speed, as well.

A display of the instrument cluster may be implemented as a liquid crystal display or as a head-up display. Both displays may require less space in a motor vehicle compared to a cathode ray tube display, and may be easy for a user of the vehicle to read.

Moreover, the processing unit may be connected or coupled to a device for audio output, so that in the case of ascertained measured values of driving and operating data which require special attention and or/an action on the part of the driver, the driver may receive an additional acoustical warning in addition to the display adapted to the situation.

DETAILED DESCRIPTION

An exemplary method according to the present invention and an exemplary device of the present invention for implementing the exemplary method are explained in terms of an instantaneous vehicular speed as a measured value to be displayed.

Figure 1:
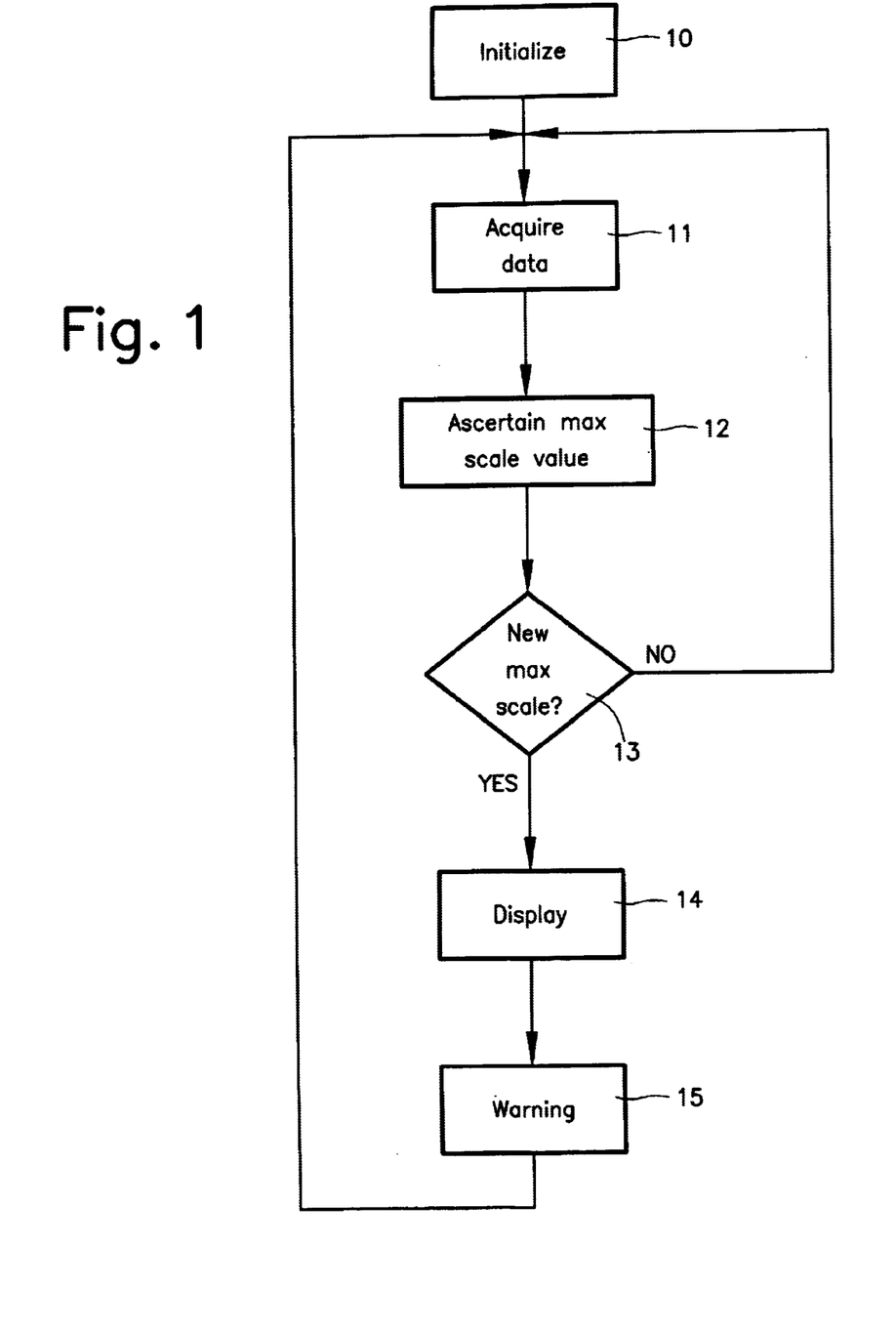
FIG. 1 shows an exemplary method of the present invention for displaying a measured value, using a display of a vehicular speed in a freely programmable instrument cluster as an example.

FIG. 1 shows an exemplary method of the present invention for displaying a vehicular speed. A display of the vehicular speed is initialized with an initialization step 10, for example, when starting up the engine. Standard operating data for the display of a speed, such as a maximum and a minimum scale value of the speed indicator, which is a function of the maximum speed of the vehicle, may be loaded, for example, from a non-volatile memory into a memory of a display device. A maximum scale value may be provided which exceeds a maximum design speed of the vehicle by, for example, 40 km/h. In the exemplary embodiment selected, 0 km/h is provided as the minimum scale value. With this, a display range is initially established for the display of the speed.

Initialization step 10 is followed by a data acquisition step 11. In data acquisition step 11, all relevant data are ascertained for setting the speed indicator, particularly for the display range. To that end, a position of the vehicle is determined by a navigation device present in the vehicle. From the position of the vehicle, the road class on which the vehicle is located is determined, and from the road class, a maximum speed allowed is ascertained as a function of a stored highest speed. Furthermore, using a camera mounted on the vehicle, a check is made as to whether a traffic sign which specifies a maximum speed allowed has been detected by the camera since the last run-through of data acquisition step 11.

In addition, the driving and operating data of the vehicle, thus, for example, oil pressure, coolant temperature, state of a trailer hitch and/or on-position of a fog light are acquired. If the oil pressure is too low or the coolant temperature is too high, it may be desirable not to drive too fast. Here, the vehicle manufacturer may need to specify a value, e.g. 60 km/h. When driving with a trailer, speed restrictions may exist dependent on the road classification, for example, 80 km/h on autobahns in Germany. The rear fog light may only be activated if the visual range is below 50 m, so that one may not drive faster than 50 km/h. Speed restrictions which exist timewise, for example, due to smog or restrictions as a function of the traffic density, or locally, for example, construction site or tunnel, are queried via a radio link to radio beacons and/or to a Service Node.

In a subsequent calculation step 12, a maximum scale value of the speed indicator is ascertained from the data acquired in data acquisition step 11. This is accomplished in that, in each case, a permissible maximum vehicle speed is ascertained from the data and speed restrictions, respectively, determined in data acquisition step 11. In this context, the lowest allowed or possible speed is selected as the maximum speed from the ascertained maximum speeds. For example, if the vehicle is traveling in a trouble-free manner on a country road (maximum speed 100 km/h), it may have at its disposal a maximum design speed of 180 km/h; and if at the same time, however, a traffic sign is detected having a restriction to 50 km/h, then 50 km/h is determined as the permissible maximum speed.

To obtain the maximum scale value, the maximum permissible speed determined in this manner is increased by a first percentage, so that even small exceedings of the permissible maximum speed may be displayed in the speed indicator. The value determined in this manner is rounded off upward to a value divisible by ten without remainder, so that a scale inscription may be implemented with exact values which may make it easier for a user to read. In this context, there may be a round off upward to a value exactly divisible by five.

It may be of particular interest when only a display of small amounts is implemented, i.e. when a display of the speed is implemented in miles per hour. A value of 40% may be provided as a first percentage. An upper limit for the maximum scale value, such as, for example, double the permissible speed, may be provided as a second percentage. For simplification, however, an additive increase to a permissible maximum speed with a subsequent rounding off upward may also be provided. For permissible maximum speeds below 30 km/h, this is, for example, 20 km/h; for permissible maximum speeds of 30 km/h to below 50 km/h, this is 30 km/h; for permissible maximum speeds from 50 km/h to less than 80 km/h, this is 40 km/h; for permissible maximum speeds from 80 km/h to below 100 km/h, this is 40 km/h; and for maximum speeds above 100 km/h, this is 50 km/h.

In a decision step 13 following calculation step 12, it is checked whether a new maximum scale value has been yielded for the speed indicator by calculation step 12. If this is the case, then there is a branching to a display step 14.

In display step 14, the speed scale is adapted to the new maximum scale value in the display of the freely programmable instrument cluster. If the instantaneous driving situation requires increased attention by a vehicle driver, such as a special attention to the speed indicator, then in display step 14, the speed scale is displayed enlarged and/or in a warning color, e.g. red, orange or yellow. This may be the case, for example, when the rear fog light is activated or when the variably predefined speed restriction changes in an area. In a subsequent warning step 15, the driver may be warned acoustically, so that he/she is not irritated by a suddenly changed display of the speed. After that, there is a branch back to data acquisition step 11. Data acquisition step 11 is also reached directly from decision step 13 in the event that it is determined in decision step 13 that no change of the speed indicator may be necessary. The method of the present invention proceeds as long as the vehicle is in operation. When the vehicle engine is switched off, the method is broken off at any position, and begins again with initialization step 10 during a new start-up of the vehicle.

Figure 2A:
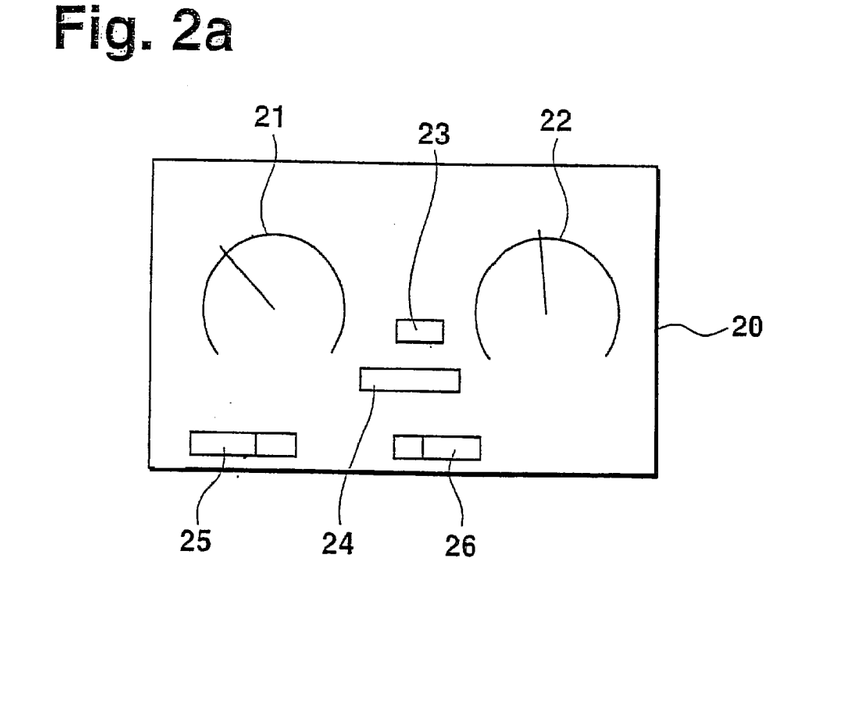
FIG. 2a shows a configuration of a freely programmable instrument cluster according to the related art.

FIG. 2a shows a first display 20 of a freely programmable instrument cluster as may be found in other prior systems. In first display 20, which is implemented in a display unit of the freely programmable instrument cluster, a first speed indicator 21 and a first tachometer 22 are shown as round instruments. A trip recorder 23 and an odometer 24 are also provided. Moreover, a fuel level indicator 25 and a coolant-temperature gauge 26 are provided in first display 20.

Figure 2B:
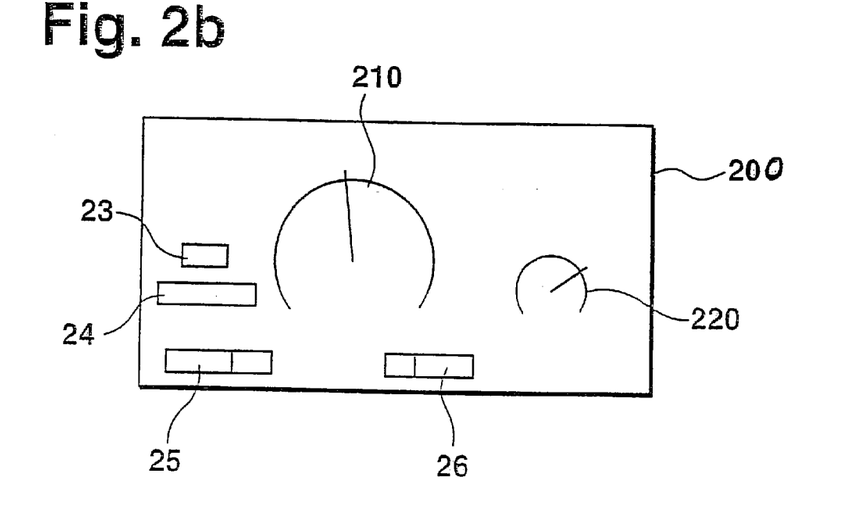
FIG. 2b shows an enlarged display of a speed indicator according to an exemplary method of the present invention as a round instrument in a freely programmable instrument cluster.

FIG. 2b shows a second display 200 of the freely programmable instrument cluster altered according to an exemplary method of the present invention. Here and in the following, identical reference numerals also designate identical elements. A second speed indicator 210 is shown enlarged compared to first speed indicator 21. A second tachometer 220 is shown reduced in size compared to first tachometer 22. In this case, second speed indicator 210 may be displayed in a warning color. Second speed indicator 210 is now in a central position in second display 200, and therefore may be particularly visible to the driver. Both trip recorder 23 and odometer 24 are no longer shown in a central range of vision of second display 200. A change in the scale of second speed indicator 210 and the maximum value of second speed indicator 210 compared to first speed indicator 21 is explained in the following FIGS. 3 through 6.

Figure 3:
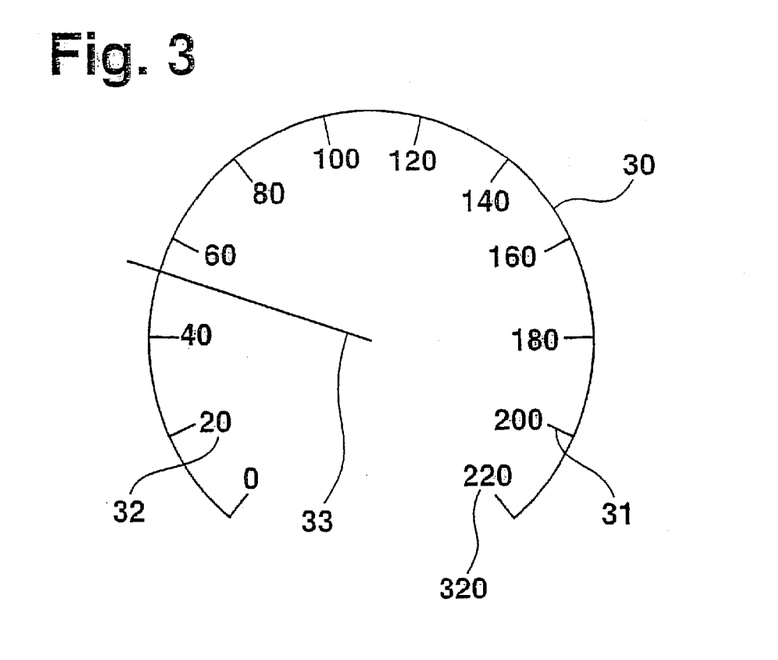
FIG. 3 shows a speed indicator as a round instrument in a freely programmable instrument cluster.

In FIG. 3, a speed indicator is shown as a segment of the display of a freely programmable instrument cluster. The speed indicator may be implemented both as first speed indicator 21 or as second speed indicator 210 from FIGS. 2a and 2b, respectively. In the display, a pointer 33 is shown which moves over a first scale 30. In this context, in one exemplary embodiment, pointer 33 is not realized as a mechanical component; rather, pointer 33 is depicted graphically in first and second speed indicators 21, 210, respectively. In a further exemplary embodiment, pointer 33 may be arranged as a mechanical component, e.g. operated via a stepping motor arranged behind the display, and merely to depict the scale in the display. First scale 30 is provided with scale gradation marks 31 which are furnished with an inscription 32. For reasons of clarity in the drawing, only one scale gradation mark and one inscription are selected for labeling with a reference numeral. Maximum scale value 320 is emphasized as a special marking. A measured value, thus an instantaneous speed of the vehicle, is displayed by a suitable positioning of pointer 33 over first scale 30, so that a speed value may be allocated clearly to one position of the pointer.

Figure 4:
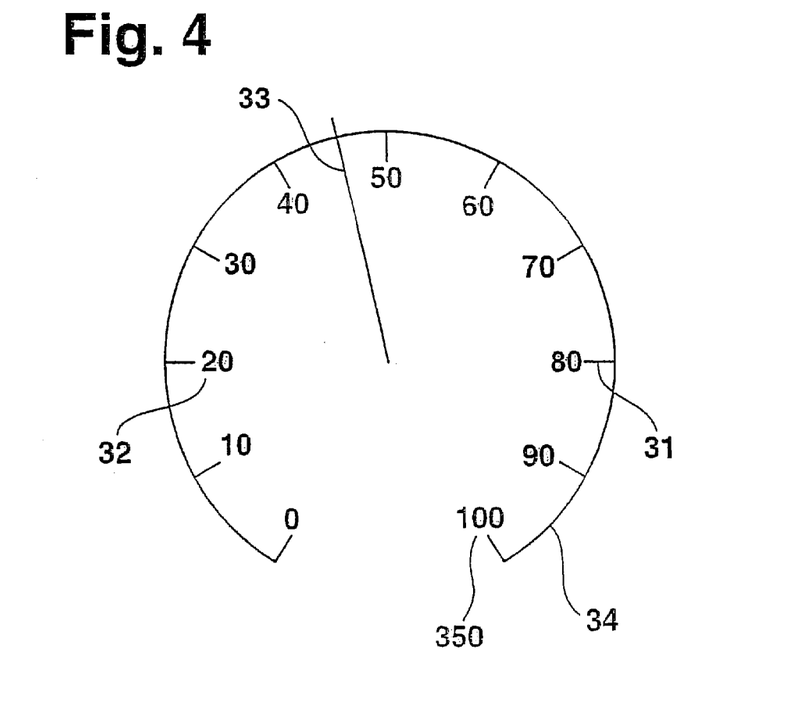
FIG. 4 shows a speed indicator altered according to the exemplary method of the present invention compared to FIG. 3.

FIG. 4 shows a second scale 34 having a second maximum scale value 350 of 100 km/h. While no restriction of the permissible maximum speed of the vehicle may exist in FIG. 3, for example, when driving on a German autobahn, in the representation in FIG. 4, a permissible maximum speed of 50 km/h now exists, for example, during urban driving or when snow chains are installed. Consequently, due to the larger spreading of the speed indicator, the instantaneous vehicular speed may be more easily readable by the observer. In addition, the maximum speed is arranged centrally in the middle and in an upper area of second scale 34, so that precisely the area of the permissible maximum speed may be particularly visible to an observer.

Figure 5:
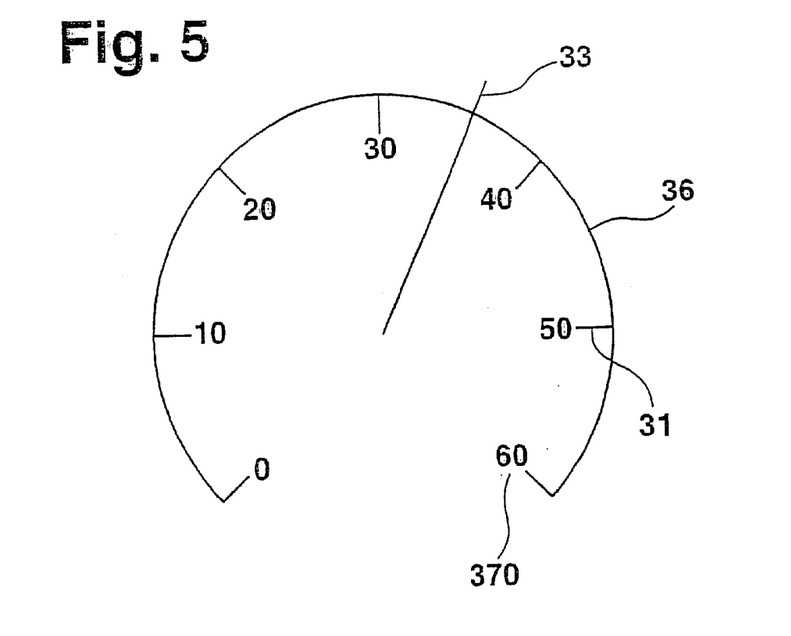
FIG. 5 shows a further speed indicator as a round instrument in a freely programmable instrument cluster according to an exemplary method of the present invention.

FIG. 5 shows a third scale 36 which is provided with a third maximum scale value 370 of 60 km/h. The permissible speed here is 30 km/h, for example, in a so-called tempo-30-zone.

Figure 6:
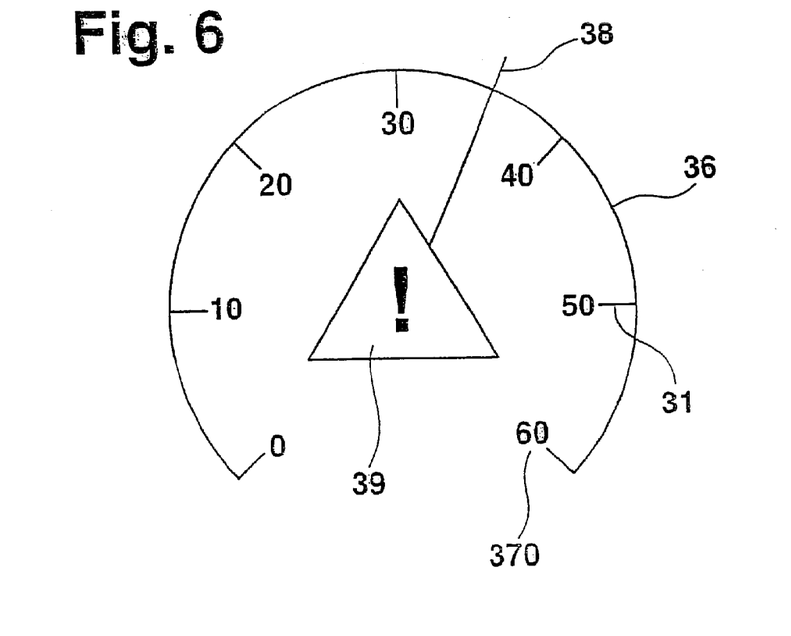
FIG. 6 shows another speed indicator having an additional warning symbol.

In FIG. 6, in addition to third scale 36, a warning symbol 39 is shown which generally indicates to the driver a possible danger, for example, imminent black ice formation. Not shown in the drawing here are other situation-related warning symbols, for example, a snow flake for imminent danger of black ice, an oil can if the oil pressure is too low or a coolant symbol if the coolant is too hot. A shortened pointer 38 is used to indicate the instantaneous speed. Because of the shortening, warning symbol 39 is not overlapped.

FIGS. 7a through 7e show a speed indicator according to an exemplary method of the present invention in a linear bar indicator 80. In another exemplary embodiment, the bar indicator may be non-linear, for example, a circular configuration of the bar indicator.

Figure 7A:
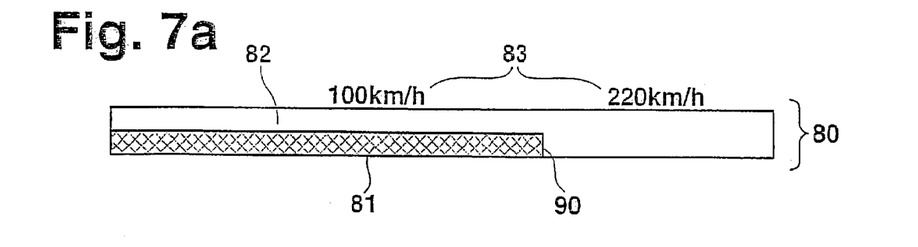
FIGS. 7a–7e show exemplary embodiments of a speed indicator according to the exemplary method of the present invention as a bar indicator in a freely programmable instrument cluster.

In FIG. 7a, bar indicator 80 is shown with an indicator bar 81, a first background 82 and a first scale inscription 83 having speed values. For reasons of clarity in the drawing, the scale inscription here and in the following is limited to two scale values. In another exemplary embodiment, more scale values may also be indicated. Indicator bar 81 in bar indicator 80 is arranged against first background 82. The speed bar begins at the left edge of the indicator and covers only regions in a lower part of bar indicator 80. The position of a right edge 90 of indicator bar 81 designates the instantaneous vehicular speed, so that for an observer, the instantaneous vehicular speed may be inferable from the position of right edge 90 and a scale inscription.

In FIG. 7a, first scale inscription 83 is selected having a speed value of 100 km/h and 220 km/h. First background 82 is, for example, green. It may not be necessary that a warning effect emanate from first background 82. Indicator bar 81 may stand out clearly in color from first background 82. Therefore, indicator bar 81 is blue, for instance.

Figure 7B:
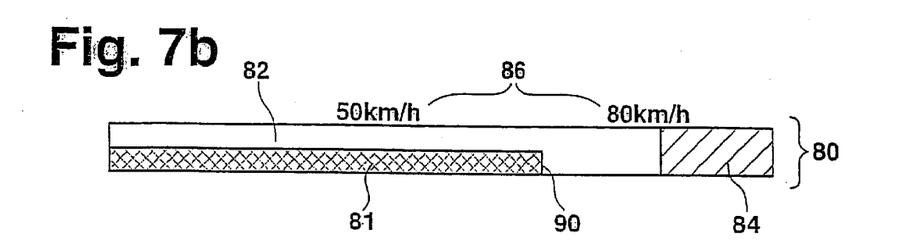

In FIG. 7b, a region is separated from bar indicator 80 and is filled in with a second background 84. Compared to FIG. 7a, a second scale inscription 86 is provided having speed values of 50 km/h and 80 km/h. The second background may be displayed in a warning color, e.g., red. This warning color symbolizes that a speed lying in the range having the second background is no longer permissible. First background 82 is disposed left of second background 84 in the bar indicator. The junction from first background 82 to second background 84 designates the maximum speed now permissible.

Figure 7C:
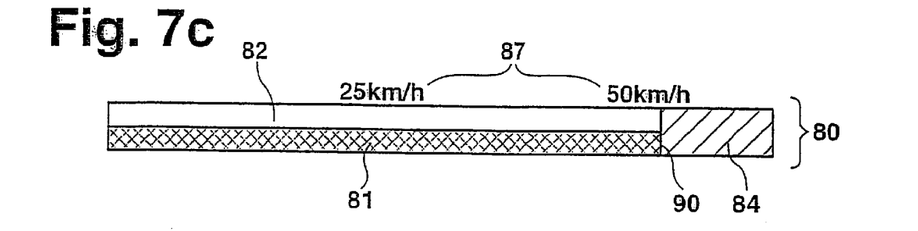
Figure 7D:
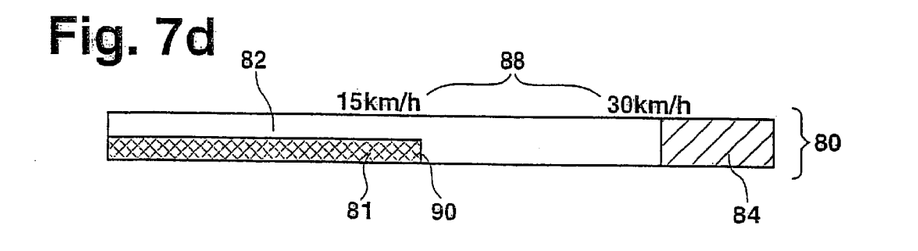

In FIG. 7c, a third scale inscription 87 is selected having 25 km/h and 50 km/h. Right edge 90 of indicator bar 81 reaches the junction between first background 82 and second background 84. This may indicate that the vehicle is traveling at precisely 50 km/h, thus, at the permissible maximum speed. In FIG. 7d, a fourth scale inscription 88 of 15 km/h and 30 km/h is selected.

Figure 7E:
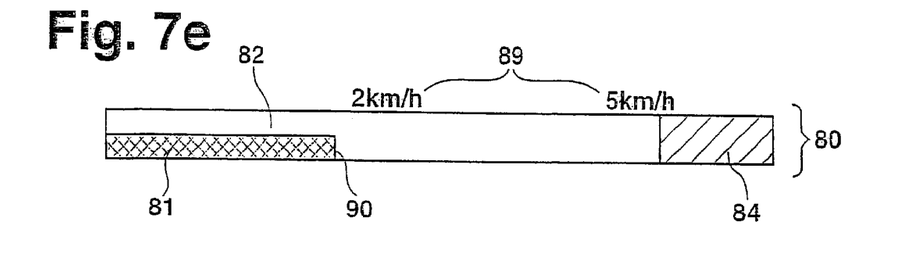

In FIG. 7e, a fifth scale inscription of 2 km/h and 5 km/h is selected. This display may be possible, for example, for play streets on which walking speed is provided as the maximum permissible speed. From first scale inscription 83 to fifth scale inscription 89, in each case with falling values of the maximally displayed speed, the size of the displayed scale inscriptions increases.

Figure 8:
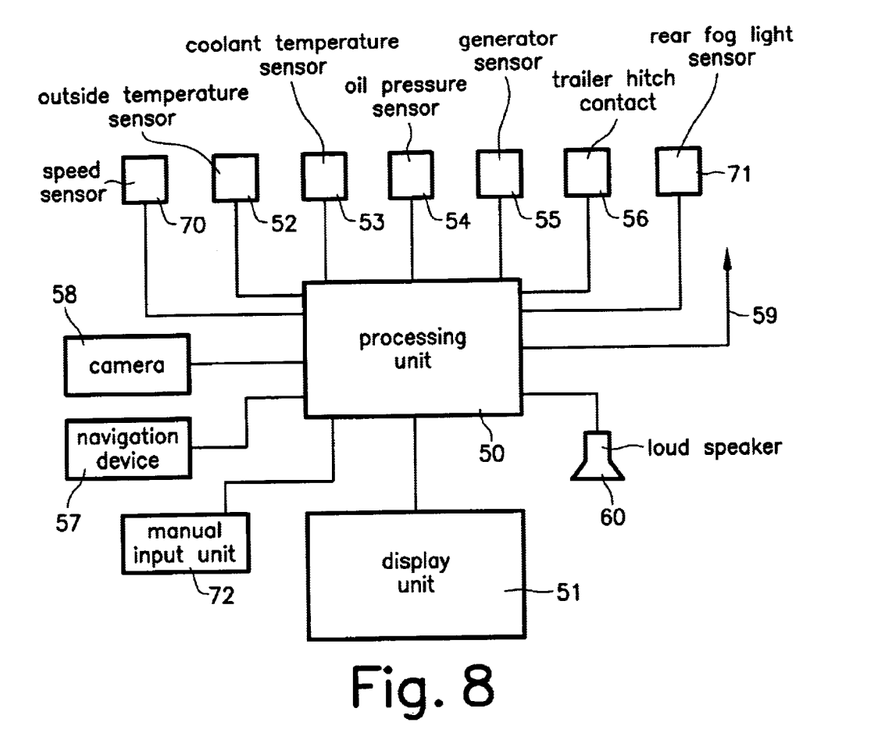
FIG. 8 shows a device for displaying the vehicular speed in a freely programmable instrument cluster.

FIG. 8 shows a device for performing an exemplary method of the present invention. A processing unit 50 is connected to a display unit 51. Processing unit 50 receives information from a navigation device 57, a camera 58, an antenna 59 having a receiving unit, and from various vehicle sensors. For example, an outside temperature sensor 52, a coolant temperature sensor 53, an oil pressure sensor 54, a generator sensor 55 and a trailer hitch contact 56 may be provided. Furthermore, processing unit 50 is connected to a loudspeaker 60. To ascertain the speed of the vehicle, processing unit 50 is connected to a speed sensor 70. The processing unit is also connected to a manual input unit 72. A rear fog light sensor 71 is connected to a starting lever of a rear fog light.

From the various sources made available to it, processing unit 50 in each case ascertains a permissible maximum speed, and from the ascertained maximum speeds, selects a minimum as the permissible maximum speed. From navigation device 57, it is determined on what class of road the vehicle is presently located, and which maximum speed is in force for this road classification. Navigation device 57, together with a satellite position finding, e.g. with the aid of the Global Positioning System (GPS), performs a position finding, allocates a position in a digital map to the whereabouts of the vehicle thus ascertained, and determines a road classification from the position in the digital map.

The permissible maximum speed in force for this road classification is stored in processing unit 50 or in navigation device 57. The digital map may be represented on a storage medium, which navigation device 57 may access. In this context, the maximum speed permissible for a road classification may be different for different countries, the country likewise being ascertainable by navigation device 57. The maximum permissible speed is then calculated by processing unit 50.

Camera 58 detects traffic signs at the edge of the road and evaluates them. If there is a traffic sign that limits the maximum permissible speed, then this maximum permissible speed is likewise communicated to processing unit 50. Contact may be established with a Service Node or with radio beacons via antenna 59 and a receiver unit connected to antenna 59. In particular, local speed restrictions, e.g., at special danger points, may be communicated to processing unit 50 via radio beacons via radio link and antenna 59. In this context, a radio beacon is, for example, a transmitter unit whose signals are only receivable in a limited transmission range in the vicinity of a danger point. A Service Node, via a radio link and antenna 59, may transmit to processing unit 50, temporary speed restrictions such as speed restrictions because of fog or too high a concentration of ozone in the air. Outside temperature sensor 52 may output a warning to processing unit 50 when the outside temperature is near the freezing point. Accordingly, processing unit 50 may output a warning to the driver and may restrict the maximum permissible speed.

If coolant temperature sensor 53 or oil pressure sensor 54 reports a coolant temperature which is too high or an oil pressure which is too low, a maximum speed of, for example, 60 km/m is established so that damage to a vehicle engine may be avoided to the greatest extent possible. If the generator sensor reports a fault in the generator, then processing unit 50 is likewise able to warn the driver and to adapt the display of the vehicular speed to the permissible maximum speed. If it is determined via trailer hitch contact 56 that a trailer is present, the display of the vehicular speed is adapted to the maximum speed permissible for a vehicle having a trailer. Rear fog light sensor 71 detects whether the driver has switched on the rear fog light. Since this may only be performed in response to a visual range of below 50 m, the display of the vehicular speed is adapted to a permissible maximum speed of 50 km/h.

In addition, the rear fog light sensor may also be combined with a visual range sensor, which detects the visual range in the air surrounding the vehicle, for example, on the basis of an absorption measurement. The instantaneous vehicular speed is ascertained via a sensor, e.g. a speed sensor 70, provided for this purpose, which is arranged, for example, in the region of the front axle and which is able to detect the revolutions of the front wheels. A desired maximum speed, which is lower than the maximum speed of the vehicle, may be input via input unit 72, including for example, and thus the display range of the speed is alterable by the driver. Restrictions of the maximum speed are thereby determined and displayed according to the invention, which could only be determined in a costly manner electronically, such as restrictions because of snow chains installed on the wheels of the vehicle, or mud and snow tires whose use may no longer permit the maximum design speed of the vehicle.

The devices for data acquisition shown represent a possible selection from various data sources. Further possible data sources may likewise be connected to processing unit 50. On the other hand, data sources already present in the vehicle, e.g. sensors, may be used in order to minimize the costs for the device.

Processing unit 50 is provided with at least one microprocessor and one memory (not shown in FIG. 8). Processing unit 50 calculates the image of the freely programmable instrument cluster to be represented in the display unit. Other sensors and data connections that may be necessary for this purpose, for example, to a mobile telephone or for further vehicle parameters considered unnecessary for the speed and the driving safety and therefore not displayed. The driver is warned via a loudspeaker 60 when the depiction of the speed indicator by display unit 51 has changed. In this context, display unit 51 may be configured as a liquid crystal display or a head-up display. The driver may also be warned acoustically when the permissible maximum speed is exceeded by a predetermined extent.

Figure 9A:
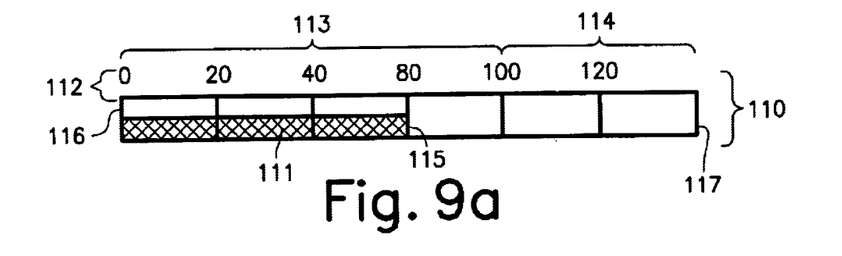
FIGS. 9a and 9b show a coolant temperature display according to an exemplary embodiment of the present invention.
Figure 9B:
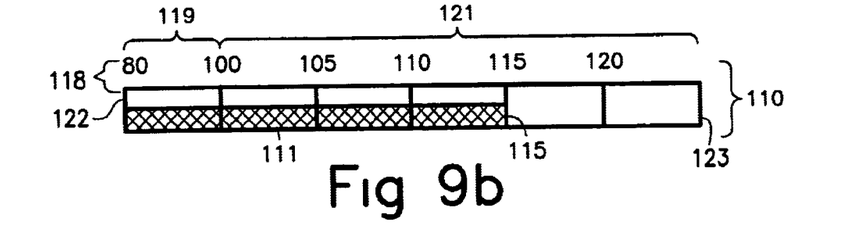

FIGS. 9a and 9b show a coolant temperature indicator whose display is implemented according to an exemplary method of the present invention. In FIG. 9a, a coolant temperature is represented by an indicator bar 111 in a bar indicator 110. Bar indicator 110 is provided with a scale inscription 112 which increases from a minimum value at a left edge 116 of bar indicator 110 to a right edge 117 of bar indicator 110. In FIG. 9a, left edge 116 represents a temperature of zero degrees Celsius, and right edge 117 represents a temperature of 140 degrees Celsius. A right edge 115 of indicator bar 111 represents the present temperature of the coolant. Indicator bar 111 extends from left edge 116 to right edge 115 of the indicator bar. In so doing, indicator bar 111 runs only in a lower part of bar indicator 110. An upper part of the bar indicator remains free, so that a background is visible. In a first range 113, which runs from a temperature of zero degrees Celsius to a temperature of 100 degrees Celsius, a first background is selected. This background may be displayed in a color to which no warning function is generally assigned, for example, green. In a second range 114, a color to which a warning function is generally assigned, e.g. red, is used as background. The display in FIG. 9a may be provided for operation during which a low or at most a normal coolant temperature exists.

In FIG. 9b, indicator bar 111 runs between a left edge 122 of bar indicator 110 and a right edge 123 of bar indicator 110. A temperature value of 80 degrees Celsius is assigned to left edge 122. As in the case of right edge 117, a temperature value of 140 degrees Celsius is assigned to right edge 123. Accordingly, a scale inscription 118 now has a temperature range from 80 degrees Celsius to 140 degrees Celsius. In this context, the display may not necessarily have to be linear. In a first range 119, a temperature range of 20 degrees Celsius is covered. First range 119 has the same color background as first range 113 in FIG. 9a. In a second range 121, given the same extension of indicator bar 111 as in first range 119, only a temperature difference of 5 degrees Celsius is covered, so that a display is achieved which may be read more accurately. Second range 121 may have the same color background as second range 114 in FIG. 9a. In the representation in FIG. 9b, the allocation to a measured value of the coolant temperature is also effected by right edge 115 of indicator bar 111.

Figure 10A:
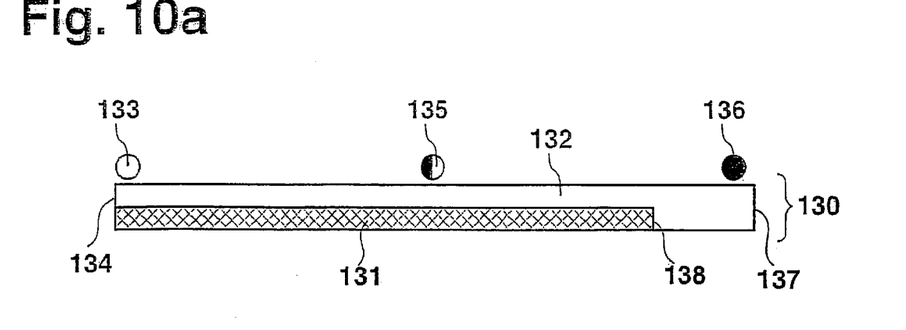
FIGS. 10a–10d show a display of a fuel level indicator according to an exemplary embodiment of the present invention.

In FIGS. 10a through 10d, a fuel level indicator is shown according to an exemplary method. FIG. 10a shows a bar indicator 130 for the fuel level. An indicator bar 131 begins at a left edge 134 of bar indicator 130 and runs up to a right edge 138 of indicator bar 131. Right edge 138 of indicator bar 131 symbolizes the filling level of the tank. Indicator bar 131 runs against a background 132. In FIG. 10a, the filling level of the tank is represented by a first symbol 133 which symbolizes an empty tank, by a second symbol 135 which symbolizes a half full tank, and by a third symbol 136 which symbolizes a full tank. First symbol 133 is disposed at left edge 134 of bar indicator 130. Third symbol 136 is arranged at a right edge 137 of bar indicator 130. Second symbol 135 is located in the middle between first symbol 133 and third symbol 136. In FIG. 10a, right edge 138 of indicator bar 131 is between the second symbol and third symbol 136. The tank is thus still more than half full. Therefore, background 132 is filled in in a color which is not a warning color, such as green.

Figure 10B:
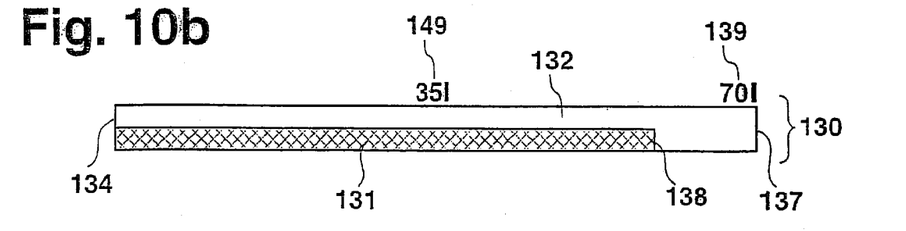

An alternative display manner to FIG. 10a is implemented in FIG. 10b. The symbols are replaced by a first inscription 149 of "35 L" and a second inscription 139 of "70 L". First and second inscriptions 149, 139 are located above bar indicator 130. In this case, second inscription 139 designates the full tank, and first inscription 149 designates the half full tank.

Figure 10C:
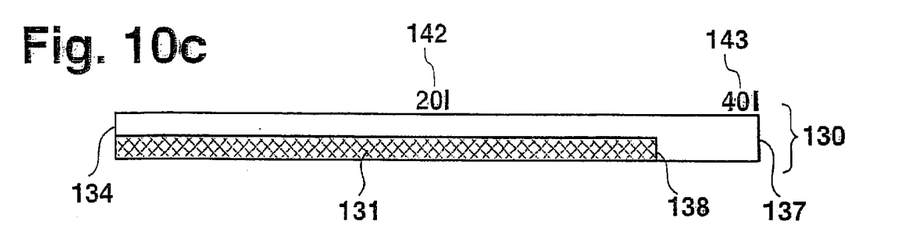

FIG. 10c shows a fuel level indicator for the case when the fuel level is approximately 35 liters, thus, the tank is, let us say, half full. A third inscription 143 of "40 L" is now allocated to right edge 137 of the bar indicator. This means that, from FIG. 10b, in the transition to FIG. 10c, the maximum scale value of the fuel level indicator was reduced from 70 liters to 40 liters. In FIG. 10c, a fourth inscription 142 of "20 L", which symbolizes a tank with a filling of 20 liters, is provided in the middle of bar indicator 130. Right edge 138 of indicator bar 131 is between third inscription 143 and fourth inscription 142, from which it is apparent that the tank may contain between 20 and 40 liters of fuel. Bar indicator 130 is divided into a first range 140 and a second range 141. First range 140 starts from left edge 134 of bar indicator 130. Second range 141 is adjacent to first range 140 to the right and ends at right edge 137.

First range 140 has a background in a warning color. The background of the second range is not necessarily in a warning color, but rather is green, for instance. The colors of the background of first and second ranges 140 and 141 differ. First range 140 symbolizes the reserve range of the tank. When the fuel level has dropped into this reserve range, an action may be necessary on the part of the driver. For example, the driver may need to either fill up from a reserve can of fuel, or stop at a gas station as soon as possible so that the vehicle may not run out of fuel.

Figure 10D:
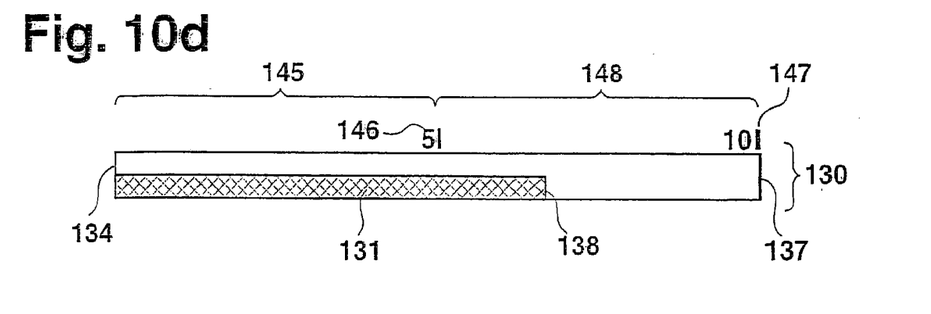

In FIG. 10d, bar indicator 130 is provided with a fifth inscription 147 at right edge 137 and a sixth inscription 146 of "5 L" in the middle above bar indicator 130. The maximum scale value is now 10 liters, as is clear from fifth inscription 147. First range 140 from FIG. 10c is extended in FIG. 10d to a reserve range 145, implemented in a warning color, which reaches up to the middle of bar indicator 130. Adjacent to reserve range 145, which begins at left edge 134 of the bar indicator, is a remaining range 148 up to right edge 137 of the bar indicator, which is not implemented in a warning color.

From FIG. 10b, over FIG. 10c up to FIG. 10d, with falling maximum value of bar indicator 130, the lettering in which an inscription of bar indicator 130 is indicated is larger.

The exemplary embodiments and/or exemplary methods are described in connection with freely programmable instrument clusters, but may be transferable to any instrument clusters in motor vehicles in which at least the display of a measured value in a screen takes place and, in this context, may be freely configured. Remaining measured values which are not represented in the freely programmable display may be represented in unchangeable displays, e.g. needle instruments.

What is claimed is:

1. A method for displaying a measured value in a freely programmable instrument cluster in a vehicle, the instrument cluster being controlled by a processing unit, the method comprising:

determining a maximum scale value of a scale for the measured value as a function of at least one further value, the at least one further value being one of a stored value and an ascertained value from driving and operating data, the scale further having a variable minimum scale value;

displaying the measured value on the scale with one of a pointer depicted in a display and an indicator bar depicted in an inscribed bar indicator; and determining a value for the variable minimum scale value, in addition to the maximum scale value.

2. The method of claim 1, wherein the driving and operating data include an oil pressure, a coolant temperature, a functioning of the generator, and an outside temperature.

3. The method of claim 1, wherein a vehicular speed is selected as the measured value.

4. A method for displaying a measured value in a freely programmable instrument cluster in a vehicle, the instrument cluster being controlled by a processing unit, the method comprising:

determining a maximum scale value of a scale for the measured value as a function of at least one further value, the at least one further value being one of a stored value and an ascertained value from driving and operating data;

displaying the measured value on the scale with one of a pointer depicted in a display and an indicator bar depicted in an inscribed bar indicator; and displaying the scale at least partially in a warning color if at least one of special action and special attention is required by a driver for the ascertained driving and operating data.

5. The method of claim 4, further comprising:

displaying the scale enlarged if at least one of special action and special attention is required by a driver for the ascertained driving and operating data.

6. The method of claim 4, wherein a vehicular speed is selected as the measured value.

7. The method of claim 6, further comprising:

determining a position of the vehicle with a navigation device;

determining a road classification from the position of the vehicle; and determining a maximally allowed speed as a function of the road classification.

8. The method of claim 6, further comprising:

detecting a traffic sign with a camera; and determining a maximally allowed speed as a function of a maximum speed indicated on the traffic sign.

9. The method of claim 6, further comprising:

transmitting a maximally allowed speed to the vehicle via a radio link.

10. A method for displaying a measured value in a freely programmable instrument cluster in a vehicle, the instrument cluster being controlled by a processing unit, the method comprising:

determining a maximum scale value of a scale for the measured value as a function of at least one further value, the at least one further value being one of a stored value and an ascertained value from driving and operating data; and displaying the measured value on the scale with one of a pointer depicted in a display and an indicator bar depicted in an inscribed bar indicator;

wherein the maximum scale value is determined so that it exceeds a maximally allowed measured value by at least a first percentage value and at most by a second percentage value, the second percentage value being greater than the first percentage value.

11. A method for displaying a measured value in a freely instrument cluster in a vehicle, the instrument cluster being controlled by a processing unit, the method comprising:

determining a maximum scale value of a scale for the measured value as a function of at least one further value, the at least one further value being one of a stored value and an ascertained value from driving and operating data, wherein the vehicle speed is selected as the measured value;

displaying the measured value on the scale with one of a pointer depicted in a display and an indicator depicted in an inscribed bar indicator; and inputting a maximally allowed speed of the vehicle manually via an input unit, the maximally allowed speed being used as the maximum scale value of the scale.

* * * * *